ised Patent Office 3,847,864
Patented Nov. 12, 1974

3,847,864
FIRE RESISTANT ACRYLONITRILE POLYMER ARTICLES CONTAINING SUBMICRON ANTIMONY OXIDE PARTICLES
John Donald Chase, Stamford, and Robert Louis Potter, Wilton, Conn., assignors to American Cyanamid Company, Stamford, Conn.
No Drawing. Continuation-in-part of application Ser. No. 91,573, Nov. 20, 1970, now Patent No. 3,743,708. This application Feb. 12, 1973, Ser. No. 331,409
Int. Cl. C08f 45/56, 45/58
U.S. Cl. 260—45.75 B                            3 Claims

ABSTRACT OF THE DISCLOSURE

Polyacrylonitrile fiber having up to 50% by weight of a halogen containing material known to impart fire resistance to polyacrylonitriles and further containing particulate antimony oxide is improved in luster by the use of submicron antimony oxide having average particle diameter of from about 100 A to about 300 A.

---

This application is a continuation-in-part application based on U.S. patent application Ser. No. 91,573, filed Nov. 20, 1970, now issued as U.S. Pat. No. 3,743,708.

The present invention relates to articles prepared according to the teachings of said application, Ser. No. 91,573, in that it is concerned with fire-resistant or self-extinguishing compositions in which particulate antimony oxide is used as a flame retardant additive for textiles and plastics. In particular, the present invention relates to lustrious polyacrylonitrile fibers containing submicron antimony oxide.

As used herein, the term "acrylonitrile polymer" means a composition of matter which contains an average of at least about 50% acrylonitrile in the polymer molecule. The remainder of the polymer molecule may contain up to about 50% of other ethylenically unsaturated materials such as vinyl and/or vinylidene chloride as is well known in the art. Illustrative of compounds, which may be copolymerized with acrylonitrile to form polymers useful for the practice of this invention, are those found in U.S. Pats. 3,104,938 and 3,040,008 and in the other United States patents mentioned therein.

The most important commercial use for acrylonitrile polymers at the present time is in the form of fibers. Such fibers may be used as continuous filaments or as staple fibers in the production of knitted fabrics, woven fabrics, non-woven felts, pile fabrics, carpets, etc.

For many uses, it is important that the shaped articles, especially fibers, of acrylonitrile polymers be made fire-resistant or self-extinguishing when exposed to flame. It has been known thas this result could be obtained by the use of certain additives and/or the ethylenically unsaturated materials which can be copolymerized with the acrylonitrile. Such additives or materials useful in the present invention have nuclear substitution of halogen groups such as chlorine and bromine.

The combination of antimony oxide as an additive to synergize the flame retardancy property of these halogen substituted additives and to copolymerize monomers with ethylenically unsaturated monomers is well known. U.S. Pat. 3,331,797 teaches of chloroparaffins as well as with a wide variety of nuclear substituted brominated aromatic compounds in conjunction with antimony trioxide. Co-pending U.S. patent application, Ser. No. 91,573, filed Nov. 20, 1970, discusses particulate antimony oxide in combination with brominated and/or chlorinated aromatics for fire retardancy of polyacrylonitriles. Such particulate antimony oxide, however, delusters the fibers and reduces their attractiveness in commerce.

In our copending parent application, Ser. No. 91,573, it is shown that the presence of submicron sized particles of antimony oxide, however, need not reduce the luster of an acrylic fiber. It is this application which has first disclosed antimony oxide particles having an average particle diameter of from about 100 A. to about 300 A. This discovery has made possible the retention of fiber luster while making available the synergistic effect of antimony oxide on the halogen containing fire resistant additives and monomers for commercial utilization in polyacrylonitrile fibers as well as the polyolefine compositions such as taught in U.S. Pat. No. 3,331,797. Such polyolefines are polyethylene, polypropylene, polyisobutylene and the solid mixed polymers of the corresponding monomers. The polyolefines may contain the usual additions of fillers, colors, lubricants, and/or stabilizers.

The expression "flame-resistant" as employed herein, means a material which imparts resistance to afterflame after being ignited in an open flame and then removed from the flame.

The preparation of the antimony oxide in submicron particle size is fully set forth in said application, Ser. No. 91,573, filed Nov. 20, 1970, now U.S. Pat. No. 3,743,708. Briefly, the submicron antimony oxide particles have been produced by the steps of: introducing a feed of antimony and/or antimony oxide into a plasma or tail flame thereof; vaporizing said feed in said plasma including the tail flame portion thereof; admixing a secondary gas into said tail flame in an amount to provide less than 0.01 grams of said vaporized feed per liter of admixed gas and plasma as a controlled quench to cool rapidly the antimony oxide; and, adjusting the oxidizing component of said secondary gas as required to assure complete oxidation of said antimony oxide. The precipitated oxide can be collected by filtration through a filter ranging in particle average diameter of 100 A to 300 A.

The submicron oxide can then be added to the polymer dope solution as a dry powder or as a colloidal suspension in water. The suspension can be produced by conventional means such as a colloid mill. A dispersing agent can be usefully added to the colloidal suspension.

Polyacrylonitrile and many of the fiber and film-forming copolymers of acrylonitrile are advantageously fabricated by a wet-spinning process wherein the polymer composition is extruded from compositions of the polymer in polyacrylonitrile dissolving solvents, particularly aqueous solutions of sodium thiocyanate.

The additive and antimony oxide must be uniformly dispersed in the polymer solution or spin dope. Such may be produced by dissolving the additive in the spin dope or polymer solution if such additive is soluble therein or may be produced by any of the mechanical techniques for dispersing insoluble liquids or solids when the additive compound is insoluble in the polymer solution or spin dope. The technology of producing the uniform dispersion of additive and antimony oxide will not be described in detail herein since such techniques are well known in the art and are used for dispersing materials, such as titanium dioxide delusterants, dyes, pigments, etc., in polymer solutions and spin dopes.

The amounts of the halogen containing fire retardant additive or monomer present in the acrylonitrile polymer to be protected cannot be set forth categorically with specific numerical ranges since different amounts of fire-retardancy or self-extinguishing characteristics may be needed for different uses to which the acrylonitrile polymer articles may be put as well as due to (a) the differences in halogen contents of the various brominated and/or chlorinated additives or monomers which are useful, (b) the relative higher effectiveness of bromine compounds as compared with corresponding chlorine compounds, (c) the varying synergism of the antimony oxide with the many additives, and (d) the desired degree of flame-retardancy to be achieved. However, using the principles of the present invention, and known tests such as ASTMD 2863-70, one can readily determine the optimum concentrations of compounds in this synergistic mixture which should be used for any given application to achieve satisfactory effective fire-resistant or self-extinguishing characteristics and still retain the useful luster index of the polyacrylonitrile fiber.

For purposes of this disclosure, a luster index of 30% is established as the boundary between commercial utility and non-utility, i.e., values below 30% lack requisite luster. Luster index is obtained by a comparison of several reflectivities of fiber wound into yarn.

In determining the decrease in luster several measurements of the fiber reflectance are made in order to establish a luster index. The luster index is determined by reflectance recorded with a Hunterlab D–16 Glossmeter. The test provides a quantitative measurement of fiber luster that correlates with visual assessment of luster. The fiber samples are prepared for test by wrapping yarn about a cardboard. Light reflected from the surface of the yarn sample is viewed and measured in the +60° (specular) and the +20° (diffuse) direction. Luster in percent is equal to $$\left[1 - \frac{\text{diffuse reading}}{\text{specular reading}}\right] \text{ times } 100.$$

Although known at least in part in the art, it may be useful to detail representative additives and monomers which provide fire resistance.

U.S. 2,669,521 describes the use of chlorinated hydrocarbons, particularly chlorinated paraffin wax in combination with an inorganic oxide, preferably antimony oxide, and tricresyl phosphate as a flame proofing mixture for polymeric thermoplastic materials.

U.S. 3,271,343 describes polyacrylonitriles flame retardend with polyepihalohydrins.

Another approach appears in U.S. Pat. 3,697,218 wherein the polyacrylonitrile has as one constituent thereof a polymerized ethylenically unsaturated glycidyl compound of which is reacted with a bromine, chlorine or phosphorous containing compound.

It is also known that the halogen content of halogenated organic compounds often has an effect of reducing the flammability both of the compound containing the halogen and of flammable organic materials intimately admixed therewith.

Other suitable additives include: nucleus halogenated diaromatic compounds halogenation products of dibenzyl, dimethylbenzyl, diethylbenzyl, benzyltoluene, dibenzyltoluene, benzylmethylbenzylbenzene, diphenylpropane, diphenyls and their mixtures; diaromatic or aromatic-aliphatic ethers containing at least three nucleus substituted bromine atoms; 2,4,6 tirboromanilines; hexabromobenzene; bispentabromophenyl ether; hexachlorobenzene; pentachlorophenol; pentabromophenol; pentabromomonochlorobenzene; 1,4,5,8 - tetrabromonaphthalene; hexabromonaphthalenes; and, octachloronaphthalene.

As the instant invention herein relates essentially to the unique advantage in using submicron sized antimony oxide, it appears unnecessary to further apply known fire-retardant polyacrylonitrile technology.

The disadvantages of the prior art relating to the use of $Sb_2O_3$ or $Sb_2O_5$ have been overcome by the preparation of an acrylonitrile polymer fiber containing an average of at least about 50% acrylonitrile in the polymer molecule and up to 50% by weight of a halogen containing material known to impart fire-resistance to acrylonitrile articles, and further containing antimony oxide particles in an amount of up to 20% by weight of the total weight of said fiber, characterized in that said antimony oxide has an average particle diameter ranging from about 100 A. to about 300 A., whereby a lustre index of said fiber above 30% is obtained.

In its preferred embodiment the antimony oxide content of said fiber ranges from about 1 to about 10 percent by weight of the total fiber.

For a clearer and more detailed description of this invention as embodied in specific examples thereof, reference may be made to the following examples which are presented for illustrative purposes only. In these examples, all parts and percentages are by weight unless otherwise noted.

EXAMPLE 1

A flow of 0.58 g./min. of —325 mesh antimony powder is suspended in a stream of 0.8 l./min. of argon carrier gas and introduced into the radio frequency plasma through a downstream facing probe positioned in the plasma. The plasma-forming gas is argon and its flow is 1.2 s.c.f.m. The power coupled to the plasma discharge is 1.35 kw. resulting in a power density of 565 B.t.u./lb. argon. Into the plasma tail flame 10 s.c.f.m. of oxygen quench gas is admixed. White antimony oxide product, collected by passage of the gas stream through a heat exchanger and through a filter bag, was obtained in 91% yield. The antimony oxide product had a surface area average particle diameter of 340 A.

EXAMPLE 2

A flow of 0.43 g./min. of 0.15–0.2 antimony oxide powder (Harshaw Chemical Co.) is suspended in a stream of 1.2 l./min. of oxygen carrier gas and introduced into the plasma. The plasma forming gas is argon and its flow is 1.2 s.c.f.m. The power coupled to the plasma is 1.35 kw., resulting in a power density of 560 B.t.u./lb. argon. Into the plasma tail flame 10.3 s.c.f.m. of air was admixed. White antimony oxide was collected as above and at substantially 100% yield. The antimony oxide collected had an average particle diameter of 142 A.

EXAMPLE 3

A high intensity arc is maintained between a 1 in. diameter anode, comprised of a mixture of antimony oxide and graphite and a ½ in. diameter thoriated tungsten cathode. The cathode is constructed by compressing a mixture of 75 parts of —140 mesh antimony oxide with 22 parts of graphite and a suitable binder. The arc current is 450 amps and the electrode vaporization rate is 1.3 lb./hr. The electrodes are situated in a closed chamber whereby an air quench line was incorporated along with the electrodes. Air quench gas at a rate of 3 s.c.f.m. is injected into the tail flame at an angle of 45° from the anode axis and 1½ in. from the anode. The gas flow from the arc chamber passes through a connecting heat exchanger at the outlet of which is a filter bag for collection of the $Sb_2O_3$. The exit gas passes through the filter bag to an exhaust duct. The $Sb_2O_3$ product is collected in substantially 100% yield and has a surface area average particle diameter of 170 A. In addition to $Sb_2O_3$, the solids product collected contained 0.12 weight percent carbon.

EXAMPLE 4

Antimony oxide made by the process of Example 2 was tested as a nondelustering fire retardant additive in acrylic fiber. The antimony oxide was mixed by colloidal mill in a spin dope of acrylonitrile polymer (89.3% acrylonitrile- 10.7% methyl methacrylate) dissolved in a solvent for the polymer (50 parts sodium thiocyanate—50 parts water) to produce a uniform fine dispersion thereof. Thereafter, the spin dope was filtered, extruded through spinnerette orifices, coagulated (using a 12% aqueous sodium thiocyanate solution at 3° C. as coagulant), washed free of solvent, dried, and relaxed at 130° C. in a water-steam environment to prepare fibers by a known process.

The fiber contained 3% by weight of various sized antimony oxide particles as the sole additive. Luster index measurements were made on the fiber and are shown below. An acceptable luster index (indicative of the brightness of the fiber) is 30%.

TABLE I

| Run | Average diameter (A). | Luster index |
|---|---|---|
| Commercial $Sb_2O_3$ | 5,000 | 6 |
| 37 | 820 | 12 |
| 47 | 540 | 17 |
| 48 | 290 | 43 |
| 50 | 208 | 50 |
| 46 | 150 | 61 |

As the particle size of $Sb_2O_3$ was decreased, acceptable luster indices were obtained.

EXAMPLE 5

Instead of admixing the antimony oxide as a powder, this Example features its incorporation into polyacrylonitrile dope solution as a colloidal suspension. The colloidal suspension is 10% $Sb_2O_3$ in water with stibnic acid dissolved therein. The colloidal suspension, having an average particle diameter of about 150 A., can be obtained from Nyanza Corp. of Ashland, Mass. The colloidal suspension was progressively diluted with sodium thiocyanate solutions of increasing sodium thiocyanate concentration until a stable system having a concentration of about 43% by weight sodium thiocyanate with about 5% $Sb_2O_5$ was obtained. An appropriate amount of this antimony oxide-suspension in a sodium thiocyanate solution was in-line mixed with a polyacrylonitrile (89.3% of acrylonitrile and 10.7% of methylmethacrylate) dope solution of 11.2% polymer, 40.5% sodium thiocyanate and 48.3% water to obtain variations of antimony content in the fiber. The uniformly mixed polymer dope solution was then immediately spun and processed into fiber as above. The results were as follows:

TABLE II

| Sample | Percent $Sb_2O_5$ | Particle size | Luster index |
|---|---|---|---|
| 1 | 2.68 | 150 A | 55.1 |
| 2 | 6.34 | 150 A | 52.7 |
| 3 | 4.24 | 150 A | 51.6 |
| 4 | | | 54.4 |
| 5 | 2.99 | ~1μ* | 19.6 |

* Commercially available grade antimony oxide.

The data of Tables I and II show the lustrous character of polyacrylonitrile fibers containing synergistically useful amounts of antimony oxide. Amounts of antimony oxide up to 20% by weight of the fiber can be usefully added to polyacrylonitrile fibers without deleteriously affecting the luster.

EXAMPLE 6

The flame retardancy of polyacrylonitrile fibers containing antimony oxide is shown in the following test. Polyacrylonitrile (81.1% acrylonitrile, 9.7% vinyl chloride and 9.2% methylmethacrylate) fibers containing 4.0% hexabromobenzene and 2.7% $Sb_2O_5$ of 150 A. average particle diameter size were evaluated for flame-retardancy relative to polyacrylonitrile fibers (same polymer content) not containing the hexabromobenzene and $Sb_2O_5$ according to ASTM Procedure D 2863–70. In each instance the test sample had a weight of 4.5 oz./yd.$^2$ of fiber of yarn having 18 singles cotton count of 2.5 denier per filament fiber. The L.O.I. for the hexabromobenzene—$Sb_2O_5$ containing fabric was 25 as compared to the control value of 21 indicating significant fire retardancy of the fabric containing hexabromobenzene and $Sb_2O_5$. The limiting oxygen index (L.O.I.) is defined as follows:

The minimum oxygen percent in a non-combustible gas required to support combustion of plain jersey knit having a density of 4.5 ounces per square yard prepared from an eighteen singles yarn of the fiber under test.

What is claimed is:

1. An acrylonitrile polymer fiber containing an average of at least about 50% acrylonitrile in the polymer molecule and up to 50% by weight of a halogen containing material known to impart fire resistance to polyacrylonitrile articles, and further containing antimony oxide particles in an amount of from 1% to 20% by weight of the total weight of said fiber, characterized in that said antimony oxide has an average particle diameter ranging from about 100 A. to about 300 A., whereby a lustre index of said fiber above 30% is obtained.

2. The article of claim 1, wherein said antimony oxide content ranges from about 2 to about 10% by weight of the total fiber.

3. An acrylic fiber having about 3% by weight, based on said fiber, of submicron antimony oxide particles, said particles having an average diameter ranging about 100 A. to about 208 A.

References Cited

UNITED STATES PATENTS

| 3,560,441 | 2/1971 | Schwarcy et al. | 260—45.75 |
| 3,449,072 | 6/1969 | Freeman | 106—288 |
| 3,480,582 | 11/1969 | Brooks | 260—45.75 |

V. P. HOKE, Primary Examiner

U.S. Cl. X.R.

260—41 B, 45.75 R, 45.9, 45.95 G